United States Patent Office 3,044,208
Patented July 17, 1962

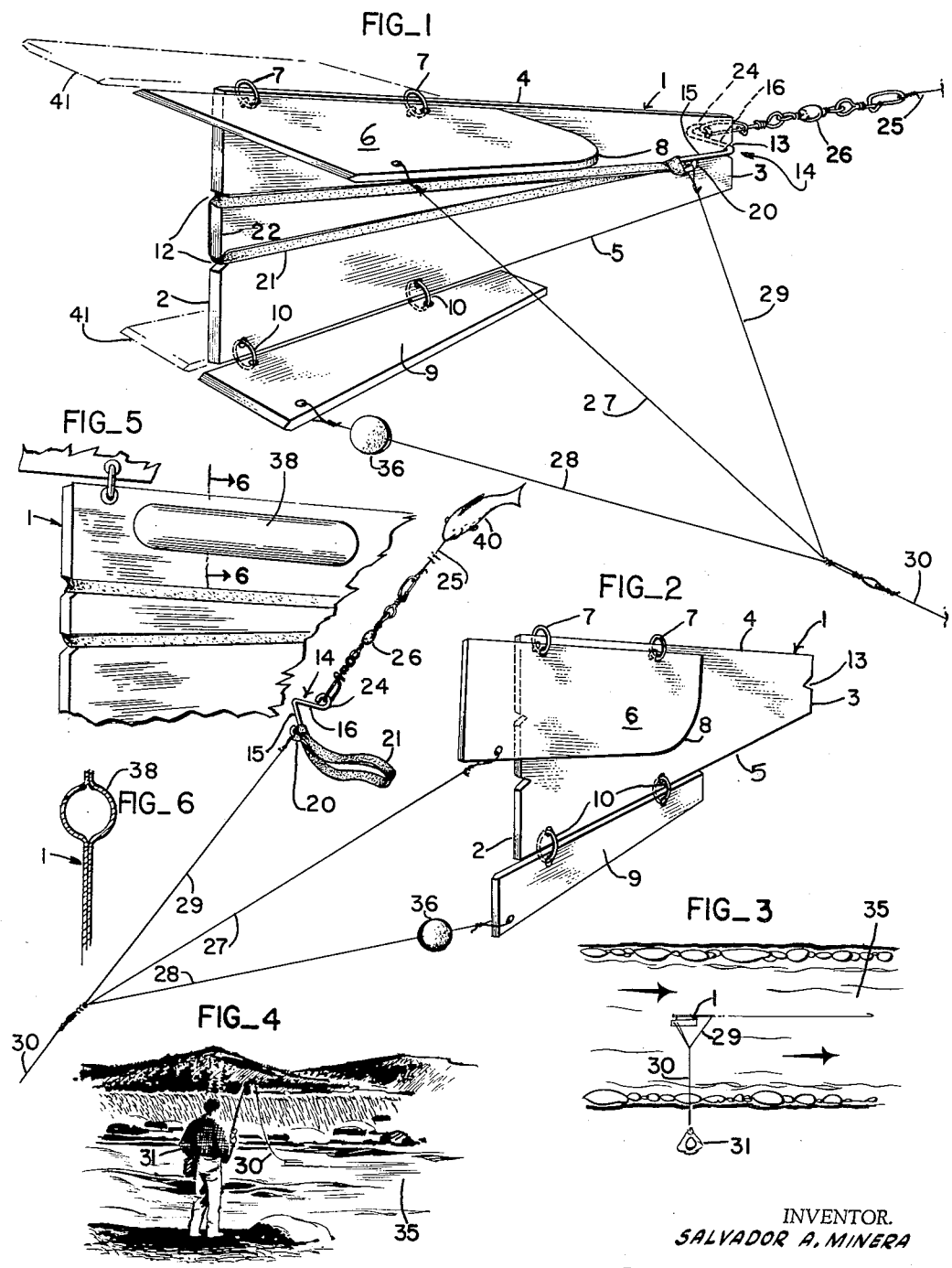

3,044,208
FISHING KITE
Salvador A. Minera, 1500 Judah St. # 10,
San Francisco, Calif.
Filed Jan. 14, 1960, Ser. No. 2,455
7 Claims. (Cl. 43—43.13)

This invention relates to a fishing kite, and is an improvement on the kite shown in my United States Letters Patent No. 2,862,326 of December 2, 1958.

One of the objects of the invention is the provision of a kite of the same general character as the one shown in said patent, but which kite is of greater simplicity than the one so shown, and is more economical to make, easier to use, and more efficient.

Another object of the invention is the provision of a kite that is readily reversable for use from either side of a flowing body of water, or of a boat, if the fisherman should be in such boat in the river or stream instead of being on the bank.

A still further object of the invention is the provision of a fishing kite in which a halter connected with the line held by the fisherman, or leading from the rod, is directly connected to wings on the kite body instead of being connected to the body, and in which one line of the halter is connected with a yieldably held release element with which the hook or line is connected.

Other objects and advantages will appear on the description and drawings.

FIG. 1 is a perspective view of the fishing kite in operative position in a flowing body of water, with the line from the fisherman to the kite being shown in full line on the near side of the kite, while the dot-dash lines indicate the position of the wings on the kite were the line positioned on the side opposite to that shown in full line.

FIG. 2 is a side elevational view of the kite of FIG. 1 in collapsed position after a fish has actuated the hook release, the size of the fish indicated in the drawing is disproportionate in size to the kite, due to the limitation of space on the sheet. Normally the representation of the fish would be appreciably larger.

FIG. 3 is a semi-schematic view illustrating the kite in a stream.

FIG. 4 is a realistic view showing the fisherman relative to the stream or flowing body of water, with the kite in the stream.

FIG. 5 is a fragmentary view showing a slight modification in the structure of FIG. 1.

FIG. 6 is a sectional view along line 6—6 of FIG. 5.

In detail the main body 1 of the kite may be of plastic or any other suitable material, and is a flat, horizontally elongated sheet. The upper and lower edges of the sheet extend convergently relative to each other from one end of the sheet to the other, and the end edges are preferably parallel and extend substantially at right angles to the longitudinal axis of the sheet.

In actual practice the wider end 2 of the body 1 will be the leading end and the opposite end 3 will be the trailing end. Also, when the kite is in use, and before a fish has been caught, the body will be substantially vertical, with the longitudinally extending edge 4 uppermost, and with the opposite longitudinally extending edge 5 lowermost. Therefore edge 4 will be called the upper edge and edge 5 the lower edge.

Hingedly secured to the main body 1 along the forward portion of the upper edge 4 is an upper wing 6.

The words "forward," "rear" and words of similar meaning are used relative to the leading edge 2 and the trailing edge 3, the forward edge and rear edge, respectively being the leading and trailing edges.

The upper wing 6 is a generally oblong sheet that may be of the same material as that of body 1, and is horizontally elongated with one of its longitudinally extending edges extending along and parallel with the upper edge 4. Rings 7 or any other suitable hinge means may be used to hingedly secure the upper wing to body 1 along the upper edge of the latter provided such means enables the wing to be freely swung thereon from one side of the body 1 to the other side, and preferably substantially flat against either side.

The rear corner of the upper wing may be rounded, as at 8, although this is not essential to its intended manner of operation. Also, the forward edge may be bevelled to come to a sharp leading edge, as seen in FIG. 1. And here again this is not absolutely essential to the successful operation of the device.

The upper wing 6 extends at its forward end a substantial distance forwardly of the forward edge 2 of the body 1. The total length of the wing 6 is substantially less than the total length of the body 1.

A lower wing 9 is hingedly secured by rings 10 or by any other suitable means, to body 1 along the forward portion of the lower edge 5 of body 1. The wing 9 is also horizontally elongated, but is preferably narrower than the upper wing 6, and it may be approximately as long as the upper wing, but preferably does not extend as far forwardly at its forward end. This lower wing is also adapted to be swung on its hinge means from one side of sheet 1 to the other thereof substantially the same as the upper wing.

The forward edges of both the upper wing and the lower wing are preferably bevelled to come to sharp edges, and if desired, the lower wing may be slightly tapered in width from its forward to its rear end.

The forward edge 2 of the body 1 is formed with a pair of spaced notches 12 that are fairly close to a central point betwen ends of the forward edge 2. A single notch 13 is centrally formed along the rear edge 3 of the body 1.

A substantially V-shaped element 14 (FIG. 2) having divergent legs 15, 16 is adapted to extend across the rear edge 3 of body 1 within notch 13 with the inner side of the element at its apex, rockingly seated against said rear edge 3 at the bottom of the notch.

The outer end of leg 15 may be formed to provide a loop 20 to which one end of an endless rubber band 21 may be secured. The opposite end of said band 21 may be passed over the central portion 22 of the leading edge of body 1 that lies between notches 12, with the band being in said notches. The band 21 must be stretched to position it in notches 12 when the element 14 is seated in notch 13 and the tension of the band will hold the element in said notch 13, unless the leg 16 is pulled rearwardly to rock element 14 to a position in which the band will quickly pull the element 14 out of said notch.

The outer end of the leg 16 of the element 14 is formed with a loop 24. Swingably held by loop 24 is one end of a line 25 that may include swivels 26 or any suitable connection for connecting a hook, lure, and the like with said element 14. The distance between the hook or hooks, or the lure or lures, and the element 14 is optional and according to the desires of the fisherman. As will appear, the kite, may stay at the upper level of a flowing stream, hence the type of fish to be caught may determine whether the line 25 is to be weighted or not, and the type of leader and bait. In an unweighted line 25, and using flies, the flies will normally be held at the desired surface level, but may be submerged as will appear.

Secured to the forward ends of the upper and lower wings 6, 9 at points adjacent to the forward corners that are remote from body 1 are flexible bridle lines 27, 28 and a similar bridle line 29 is connected with the loop 20 on leg 15 of element 14. These lines extend convergently to a meeting point remote from body 1 at one side thereof where they are connected to form a three-line bridle. At the point of connection between lines 27, 28, 29 the fishing line 30 is connected with the bridle, which line extends to the fisherman 31, and which line may be either held by the fisherman or extend from a reel on the rod that the fisherman holds (FIG. 4).

In operation, the fisherman baits the hook or attaches any desired lure to the hook line 25 and sets the same by positioning the element 14 so it will straddle the rear edge of the body 1 in notch 13. The band is then stretched over portion 22 at 12. In the event the fisherman is not interested in smaller fish that have a light pull, a relatively heavy band 21, or a pair or more of bands may be used, making it essential that a strong force be applied to leg 16 before the element 14 is released from the body 1.

The band 21 is preferably at the side of body 1 that faces the fisherman, which side is the same side as the side to which wings 6, 9 are swung (FIG. 1).

The current of the stream 35 will immediately cause the edge 2 of the body 1 to face upstream, hence the hook on the hook line 25 will trail downstream. The body 1 will be vertical in the stream and will be maintained at the surface of the stream by reason of the greater area of upper wing 6 as compared with that of wing 9. However, it is essential that the wing 9 have a substantial damping effect on any tendency of the kite to jump out of the water, and in a relatively strong, fast current, it is sometimes found to be desirable to place one or more lead weights 36 on the lower bridle line 28, which weight may be moved on the bridle line 28 any desired distance from the lower wing 9 to obtain the desired effect, but which normally is close to wing 9.

In certain other instances, particularly in a very slow current, it may be found desirable to make the kite quite light in weight and to include a float 38 (FIG. 5) adjacent to the upper forward edge of the body 1. This float may be formed by securing a pair of thin sheets of the plastic together, which sheets have opposely opening recesses formed to provide opposite halves of the flat, or any other desired structures may be used. Otherwise, the kite is the same as that of FIGS. 1 and 2.

The relative lengths of the bridle lines 27, 28, 29 and the strength of the current will largely determine whether the kite will move to a position in the stream along a line exactly perpendicular to the direction of the current, or slightly upstream or slightly downstream relative to the fisherman. Ordinarily the variation is immaterial. However, the distance of the kite from the fisherman is dependant upon how much line is released, and the kite can be made to move upstream or downstream by merely pulling and releasing the line 30 in much the same manner as wolud be done in flying a kite in the air. If the fisherman should walk or row upstream, the kite will correspondingly move upstream. Different areas in a river may be readily and easliy explored by simple manipulations of the kite.

Upon a fish 40 striking the bait or lure, the element 14 will be quickly released and the action of the rubber band 21 on the hook will cause the hook to be firmly "set" in the mouth of the fish.

Also upon the element 14 being released, the kit will collapse since bridle line 29 no longer is connected with the trailing end of the kite, and the pull of the fish will be directly through lines 30, 29 and 25 to the fish. The collapsed kite will not interfere with the fisherman "playing" the fish in the usual manner, but it will be reeled in with the fish.

The kite may be used to fish from either side of the stream by merely swinging the wings 6, 9 to the side of the body 1 that will insure the wider wing 6 being uppermost when the leading edge of the body faces upstream and the wings extend toward the bank on which the fisherman is positioned. FIG. 1 shows at 41 a dot-dash line position of the wings at the far side of body 1, which is the position the wings would occupy were the fisherman 31 (FIGS. 3, 4) on the other side of the bank, preferably the band 21 would be on the far side of body 1 were the wings swung to positions 41 to enable the bridle line 29 to properly extend from element 14.

The kite would normally jump out of the water, particularly in a fast current, were it not for the lower wing 9. However, in manipulating the kite, the fisherman may quickly slack line 30 by unreeling it and the kite will drift down stream and will also sink or become submerged until the slack is taken up, when it may gradually move to the surface, and upstream, under the influence of the current, or it may be quickly moved to the surface, and upstream, by quickly reeling in the line.

In a normal situation, the force on the three bridle lines is substantially equal, when the kite is in running water, but when the kite is out of the water and is suspended from line 30, the lines 30, 29 and 25 will be generally aligned so that a very substantial force will be required on line 25 to release the device 14. This enables the fisherman to bait the hook and swing the kite from line 30 without the device 14 being released. However, as soon as the kite is in the current and the kite is in the position of FIG. 1, the device 14 may be readily released by a pull on line 25 since the lines 29 and 25 now extend at a substantial angle to each other. Thus the force of the current on the kite has a direct and necessary influence on the release of element 14 when a pull is placed on line 25.

While it has been mentioned that the relative lengths of the bridle lines 27, 28, 29 may be varied, it is important that such variation should not be such that the kite is so far downstream relative to the fisherman that the line 29 will be so nearly on line with the trailing hook line as to make the release of element 14 too difficult. The closer the line 25 comes to being aligned with the line 29, the more difficult it is for the element 14 to be released.

The employment of a rubber band 21, which may be one of the standard rubber bands sold in stationary stores, makes it simple and easy to replace a broken or worn band, and with the present structure the matter of varying the tension on the element 14 by use of two or more bands becomes a simple, easy operation.

The fact that the upper wing 6 projects a greater distance forwardly of the sheet 1 than the lower wing 9 also contributes toward keeping the kite at the desired level of the water.

It is obvious, of course, that the size of the kite may vary from one that is approximately four to six inches in length to larger ones of eight to ten inches in length. These lengths refer to the sheet 1, and are not intended to be restrictive.

The claims appended hereto are intended to cover all changes and modifications of the example of the invention herein chosen for purposes of the disclosure, which do not constitute departures from the spirit and scope of the invention since it is obvious that certain minor changes in dimensions and relationships may be made and the kite will still be operative.

I claim:

1. A fishing kite comprising: a main, vertically disposed, horizontally extending sheet of relatively rigid material providing a body having upper and lower edges and having a forward end and a rear end; a pair of wings of sheet material; means hingedly securing said wings to said body adjacent to said upper and lower edges for swinging of said wings from a generally collapsed position respectively depending from said hinge means to a generally opposed, horizontally disposed, vertically spaced relation at one side of said body, and vice versa, an element releasably held against said rear end and yieldable means releasably secured to said body yieldably holding said element against said rear end, said element including a part thereof extending angularly outwardly from said body adapted to rock said element off said rear end upon pulling said part rearwardly away from said rear end, and means on said part for securing a hook and line thereto; a flexible bridle including flexible cords respectively directly connected with said wings at their edges that are remote from said body and with said element, said bridle being adapted to be connected with a fishing line to be held by an operator.

2. A fishing kite comprising: a main, vertically disposed, horizontally extending sheet of relatively rigid material providing a body having upper and lower edges and having a forward end and a rear end; a pair of wings of sheet material; means hingedly securing said wings to said body adjacent to said upper and lower edges for swinging of said wings from a generally collapsed position respectively depending from said hinge means to a generally opposed, horizontally disposed, vertically spaced relation at one side of said body, and vice versa, an element releasably held against said rear end and yieldable means releaseably secured to said body yieldably holding said element against said rear end, said element including a part thereof extending angularly outwardly from said body adapted to rock said element off said rear end upon pulling said part rearwardly away from said rear end, and means on said part for securing a hook and line thereto; a flexible bridle including flexible cords respectively directly connected with said wings at their edges that are remote from said body and with said element, said bridle being adapted to be connected with a fishing line to be held by an operator, said upper wing having a greater surface area than said lower wing, said upper and lower edges extending convergently from said forward end to said rear end and said hinge means supporting said wings for swinging to the opposite side of said body to enable fishing from either side of a stream.

3. A fishing kite comprising: a main, vertically disposed, horizontally extending sheet of relatively rigid material providing a body having upper and lower edges and having a forward end and a rear end; a pair of wings of sheet material; means hingedly securing said wings to said body adjacent to said upper and lower edges for swinging of said wings from a generally collapsed position respectively depending from said hinge means to a generally opposed, horizontally disposed, vertically spaced relation at either side of said body, and vice versa, an element releasably held against said rear end and yieldable means releaseably secured to said body yieldably holding said element against said rear end, said element including a part thereof extending angularly outwardly from said body adapted to rock said element off said rear end upon pulling said part rearwardly away from said rear end, and means on said part for securing a hook and line thereto; a flexible bridle including flexible cords respectively directly connected with said wings at their edges that are remote from said body and with said element, said bridle being adapted to be connected with a fishing line to be held by an operator, said body including a buoyant compartment connected with said body adjacent to its forward end and upper edge.

4. A fishing kite comprising: a flat body of sheet material having a leading edge at one end thereof and a trailing edge at the other end and supporting means carried by said body for maintaining the latter generally vertical at the surface of a body of flowing water with said leading edge facing upstream and with said trailing edge facing downstream, a flexible bridle at one side of said body including a leading portion and a trailing portion, said supporting means comprising a pair of wings of sheet material, hinge means hingedly securing said wings to said body at the upper and lower edges of said body, said wings having forward portions adjacent to said leading edge, said leading portion of said bridle being directly connected with said forward portions of said wings at points remote from said body, an element at the trailing end of said body, a hook, a hook line connecting said hook with said element, said trailing portion of said bridle being connected with said element, and yieldable means connected with said body and with said element, yieldably holding said element on said body at the trailing end thereof, said element being adapted to be released from said body upon said hook line being pulled by said hook, and means on said element connecting said hook line with said element to cause said release of said element from said body, said leading and trailing portions of said bridle being joined at a point spaced from said one side of said body for connection with a held line.

5. A fishing kite comprising: a flat body of sheet material having a leading edge at one end thereof and a trailing edge at the other end and supporting means carried by said body for maintaining the latter generally vertical at the surface of a body of flowing water with said leading edge facing upstream and with said trailing edge facing downstream, a flexible bridle at one side of said body including a leading portion and a trailing portion, said supporting means comprising a pair of wings of sheet material, hinge means hingedly securing said wings to said body at the upper and lower edges of said body, said wings having forward portions adjacent to said leading edge, said leading portion of said bridle being directly connected with said forward portions of said wings at points remote from said body, an element at the trailing end of said body, a hook, a hook line connecting said hook with said element, said trailing portion of said bridle being connected with said element, and yieldable means connected with said body and with said element, yieldably holding said element on said body at the trailing end thereof, said element being adapted to be released from said body upon said hook line being pulled by said hook, and means on said element connecting said hook line with said element to cause said release of said element from said body, said leading and trailing portions of said bridle being joined at a point spaced from said one side of said body for connection with a held line, said hinge means being construced so as to support said wings for swinging to the side of said body opposite to said one side to enable using said kite from either side of a flowing body of water.

6. A fishing kite comprising; a flat, horizontally elongated body of sheet material having a leading edge at one end thereof and a trailing edge at the other end; supporting means carried by said body for maintaining the latter generally vertical in a body of flowing water with said leading edge facing upstream; said supporting means comprising a pair of generally horizontally disposed, vertically spaced, substantially opposed wings of sheet material projecting laterally from said body to one side thereof having forward portions adjacent to said leading edge and extending from said forward portions toward said trailing edge; a flexible bridle at said one side of said body including a pair of flexible cords directly connected at one of their ends to said forward portions of said wings at points remote from said body and extending convergently from said points to substantially meeting relation at their convergent ends at a point spaced a substantial distance from said body at the side of the latter from which said wings project for connection with one end of a fishing line substantially at said point; a hook and a hook line connected at one end thereof with said hook; said bridle further including flexible bridle means releasably connecting said pair of lines at their said convergent ends with the end of said body adjacent to said trailing edge thereof; said bridle means including movable bridle release means connected with said hook line and releasably holding said bridle means in connecting relation between said pair of lines and said body, said bridle release means being actuable for movement relative to said body under the pulling force of a fish on said hook for releasing said bridle means from its connecting relation between said body and said convergent ends of said pair of lines, and hinge means connecting said wings, respectively, to said body along the upper and lower edges of said body for swinging said wings from their positions extending away from said one side to positions extending away from the side of said body opposite to said one side, and vice versa, to thereby enable said kite to be used by a fisherman on either side of a flowing stream.

7. In a fishing kite that includes a flat body of sheet material having a main, vertically disposed, horizontally extending sheet of relatively rigid material providing a body having upper and lower edges and leading and trailing edges and supporting means connected with said body for maintaining the latter generally vertical at the surface of a body of flowing water with said leading edge facing generally upstream and with said trailing edge facing downstream, said supporting means including a pair of generally horizontally disposed wings in vertically spaced generally opposed relation projecting to one side of said body and flexible bridle lines respectively connected at one of their ends with said wings at points remote from said body and with said body adjacent to said trailing edge of the latter, said lines extending convergently from said one of their ends in the same direction as said wings extend and to a point spaced from said body for connection with one end of a fishing line at said last mentioned point, hinge means respectively securing said wings to said body along said upper and lower edges for swinging said wings from their positions projecting to said one side of said body to similar positions relative to each other projecting to the opposite side of said body, whereby said kite may be used by a fisherman at either of the two opposite sides of a stream upon extending said bridle lines from said wings and body to one side or the other of such stream.

References Cited in the file of this patent
UNITED STATES PATENTS
2,862,326    Minera _____ Dec. 2, 1958